E. D. ROBERTS.
CLUTCH MECHANISM.
APPLICATION FILED JAN. 30, 1914.
1,164,398.
Patented Dec. 14, 1915.
2 SHEETS—SHEET 1.
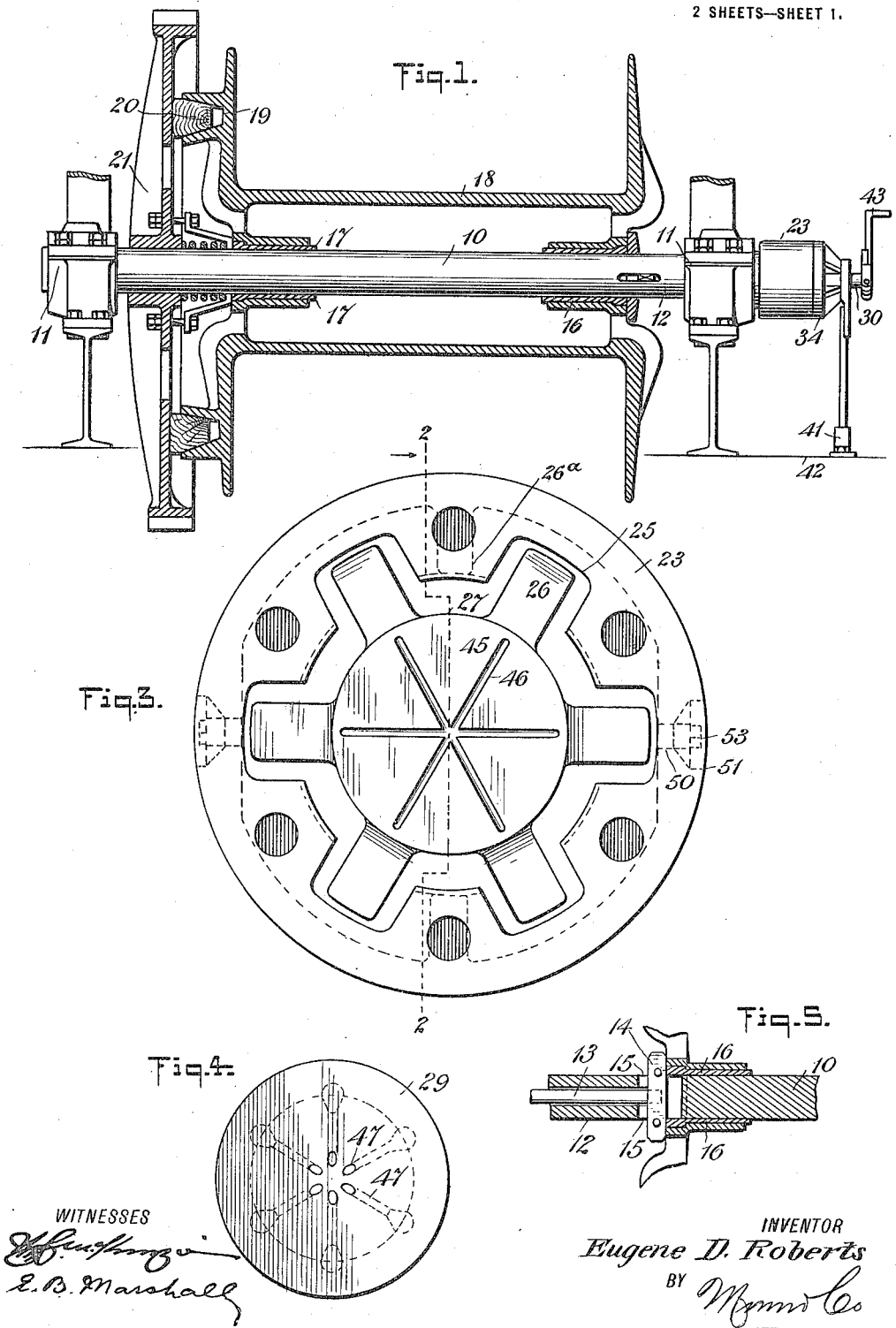

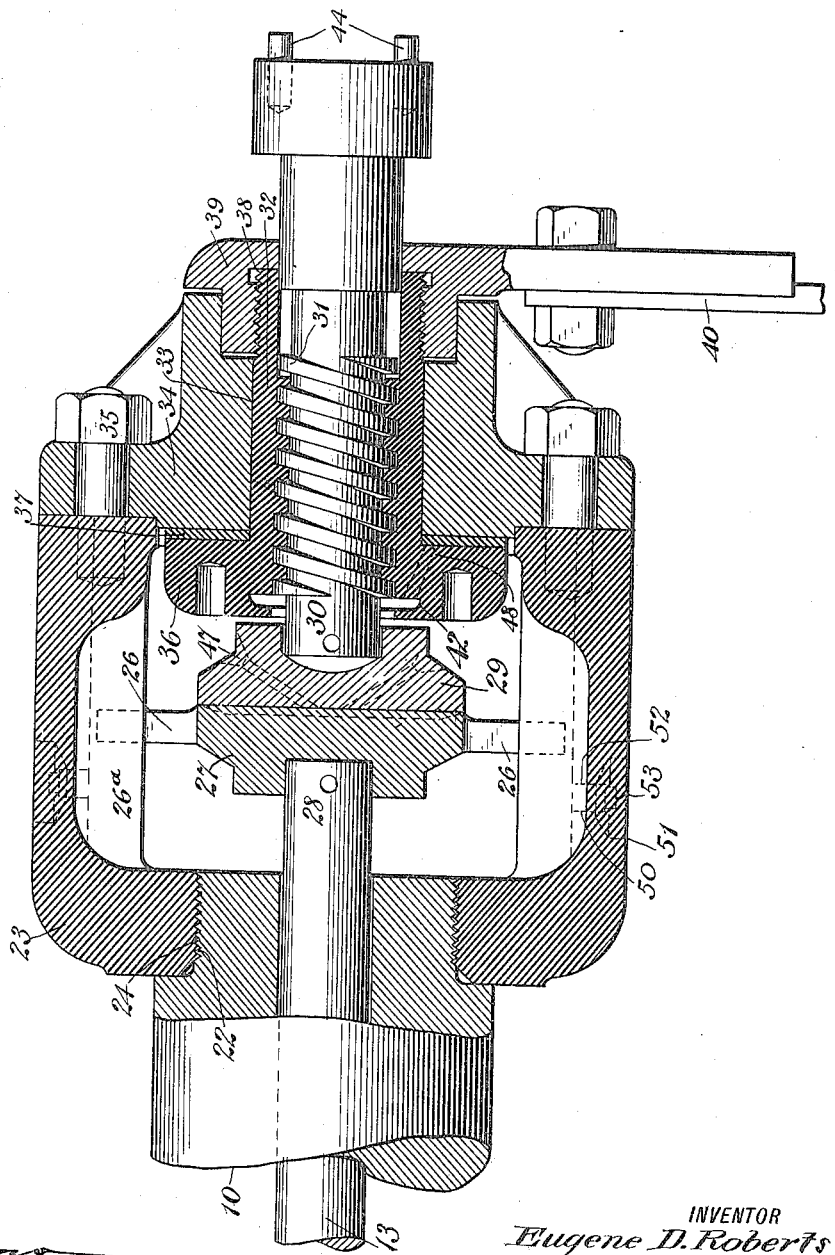

UNITED STATES PATENT OFFICE.

EUGENE D. ROBERTS, OF TACOMA, WASHINGTON.

CLUTCH MECHANISM.

1,164,398.  Specification of Letters Patent.  Patented Dec. 14, 1915.

Application filed January 30, 1914. Serial No. 815,513.

*To all whom it may concern:*

Be it known that I, EUGENE D. ROBERTS, a citizen of the United States, and a resident of Tacoma, in the county of Pierce and State of Washington, have invented a new and Improved Clutch Mechanism, of which the following is a full, clear, and exact description.

My invention has for its object to provide a clutch mechanism which will reduce to a minimum the end thrust and which, by the means provided, will efficiently lubricate the wearing surfaces to prevent an undue generation of heat.

Another object of the invention is to transmit to a casing secured to the shaft, the reacting force of the thrust screw provided for throwing into operative position the clutch mechanism. In this way all the thrust on the shaft bearings is eliminated.

Still other objects of the invention will appear in the following specification in which the preferred form of my invention is disclosed.

In the drawings similar reference characters refer to similar parts in all the views in which—

Figure 1 is a sectional elevation showing how my invention is applied to a clutch mechanism. Fig. 2 is an enlarged sectional view showing my improvement; Fig. 3 is a view taken from the end of the casing with the head of the casing removed and showing the disk which is secured to the thrust pin; Fig. 4 is a view showing on a smaller scale, the disk which is secured to the thrust screw; and Fig. 5 is a detailed view showing how the thrust pin is connected with one of the clutch members.

By referring to the drawings it will be seen that the shaft 10 is journaled in the bearings 11, this shaft 10 having a hollow portion 12 in which is disposed the thrust pin 13. This thrust pin 13 bears against a key 14, this key 14 extending through the openings 15 in the sides of the hollow shaft 10. Engaging the key 14 there is a sleeve 16 which, with the companion sleeve 17, serves to carry the pulley or member 18, this pulley or member 18 having the clutch mechanism member 19 for engaging the clutch mechanism member 20 on the wheel 21 which is mounted for rotating with the shaft 10. The extreme end of the shaft 10 is threaded at 22, and the casing 23 is threaded at 24 so that the threads 24 may mesh with the threads 22 and in this manner, the casing 23 may be secured to the end of the shaft. The face of the casing 23 has channels 25 through which may pass the arms 26 on the disk 27, this disk 27 being secured to the end 28 of the thrust pin 13. Certain of the arms 26 will contact with the ribs 26ª which are preferably two in number whereby the thrust pin 13 is caused to rotate. The several arms 26 serve to feed the lubricant in the casing 23 to the disks 27 and 29.

As a means of moving the disk 27 with the thrust pin 13 to throw the clutch mechanism into operative position, I provide a disk 29 for engaging the disk 27, this disk 29 being flexibly mounted on a thrust screw 30, the thrust screw 30 meshing with the inner thread 31 in the sleeve 32, this sleeve 32 being disposed in an opening 33 in the head 34 of the casing 23. The disk 29 is made flexible to permit uniform bearing surfaces for the disks 27 and 29. This is important for the reason that the pin 13 does not necessarily closely fit the opening in the shaft 10. The flexibility of the coupling of the disk 29 with the thrust screw is also important so that the disks will aline themselves uniformly at all times even should there be some inequality in the screw. The head 34 is secured to the casing 23 by means of the bolts 35. Extending from the inner end of the sleeve 32 there is a flange 36, the flange 36 being separated from the head 34 of the casing by a wearing plate 37. It will be understood that the casing 23 and the casing head 34 will rotate with the shaft 10 but that the sleeve 32 will be held against rotation by the means which I will now describe. The outer end of the sleeve 32 is threaded at 38, and meshing with this thread 38 there is a threaded member 39, the threaded member 39 being secured to the lever 40 which is held in a socket 41, of a fixed member 42 to prevent the rotation of the threaded member 39 with the casing 23 and the casing head 34. When the screw member 39 has been rotated to the end of the thread 38, it will hold the sleeve 32 against rotation in a manner readily understood. The thrust screw 30 may be rotated either by the crank 43 or by means engaging the pins 44 as may be desired. In the face 45 of the disk 27 there are lubricating grooves 46, and in the disk 29 there are lubricating holes 47 which are disposed radially and in the general direction of the center of the disk face 45. These lubricating holes 47 will receive the oil or other lubricant contained in the casing 23, as the casing 23 is rotated with the shaft 10. There are lubricant holes 48 in the flange 36 for conveying lubricant from the lubricant wells 42 to the adjacent surfaces of the flange 37 and the casing head 34.

When it is desired to rotate the pulley or other member 18, the thrust screw 30 is rotated by the crank 43 or the pins 44 to move the thrust pin 13 by means of the disks 29 and 27, a sufficient distance to carry the key 14 against which the thrust pin 13 bears and with the key 14, the pulley or other member 18 so that the clutch member 19 will engage the clutch member 20.

There are holes 50 in the casing 23 through which lubricant may be fed to the interior of the casing, these holes 50 having countersunk portions 51 which serve as funnels. The holes 50 are normally closed by plugs 52 which have heads 53 disposed in the countersunk portions 51, the counter-sunk portions 51 serving as a means for protecting the heads 53 of the plugs which might otherwise become damaged with the rapid rotation of the casing 23, or injure workmen.

Having thus described my invention I claim as new and desire to secure by Letters Patent:

1. In a clutch mechanism, a shaft having a hollow portion, a casing secured for rotating with the shaft and having an opening and an inwardly extending rib disposed longitudinally, a sleeve with an inner thread disposed in the opening and having a flange extending around the casing at the side of the opening, a thrust pin disposed in the shaft and having an end extending into the casing, a thrust screw meshing in the threaded sleeve with an end extending beyond the threaded sleeve and into the casing, a disk on the thrust pin and having an arm disposed for engagement by the rib, a disk on the thrust screw for engaging the first mentioned disk, means to prevent rotation of the sleeve with the casing, clutch mechanism, and means by which the thrust pin is adapted to operate the clutch mechanism.

2. In a clutch mechanism, a shaft having a hollow portion, a casing secured for rotating with the shaft, a sleeve with an inner thread, means to prevent the longitudinal movement of the sleeve relatively to the casing, a thrust pin disposed in the hollow shaft and having an end extending into the casing, a thrust screw meshing in the threaded sleeve with an end extending into the casing, a disk mounted on the thrust pin, a disk flexibly mounted on the thrust screw for engaging the first mentioned disk, means to prevent the rotation of the sleeve with the casing, clutch mechanism and means by which the thrust pin is adapted to operate the clutch mechanism.

3. In a clutch mechanism, a shaft having a hollow portion, a casing secured for rotating with the shaft and having an open end, there being channels in the casing at the open end, through which arms on a disk may pass, a disk with arms normally disposed in the casing, a rib or ribs in the casing for engagement by the said arms, a sleeve with a thread disposed in the opening and having a flange extending around the casing at the said open end, a thrust pin disposed in the shaft and secured to the said disk, a thrust screw meshing in the threaded sleeve with an end extending beyond the threaded sleeve and into the casing, a disk on the thrust screw for engaging the first mentioned disk, means to prevent the rotation of the sleeve with the casing, clutch mechanism, and means by which the thrust pin is adapted to operate the clutch mechanism.

4. In a clutch mechanism, a shaft having a hollow portion, a casing secured for rotating with the shaft and having an opening, a sleeve with an inner thread disposed in the opening and having a flange extending in the casing at the sides of the opening, there being a lubricating well in the flange which extends radially beyond its mouth at the inner end of the flange and lubricating holes in the flange which extend rearwardly from the well for conveying lubricant for the casing at the flange, a thrust pin disposed in the shaft and having an end extending into the casing, a thrust screw meshing in the threaded sleeve with an end extending into the casing, disks on the thrust pin and the thrust screw for engaging each other, means to prevent the rotation of the sleeve with the casing, clutch mechanism and means by which the thrust pin is adapted to operate the clutch mechanism.

5. In a clutch mechanism, a casing for rotating with a hollow shaft and having an open end, a disk with arms normally disposed in the casing, a rib or ribs in the casing for engagement by the said arms, a sleeve with a thread disposed in the opening, a thrust pin secured to the disk and adapted to extend in the hollow shaft, a thrust screw meshing with the threaded sleeve with an end extending beyond the threaded sleeve and into the casing, a disk on the thrust screw for engaging the first mentioned disk, and means to prevent the rotation of the sleeve with the casing.

6. In a clutch mechanism, a casing for rotating with a hollow shaft, and having an opening, a sleeve with an inner thread disposed in the opening and having a flange extending in the casing at the sides of the opening, there being a lubricant well in the flange which extends radially beyond its mouth at the inner end of the flange, lubricating holes in the flange which extend rearwardly from the well for conveying lubricant to the casing at the flange, a thrust pin normally disposed in the hollow shaft and with an end disposed in the casing, a thrust screw meshing with the threaded sleeve with an end extending into the casing, disks on the thrust pin and on the thrust screw for engaging each other, and means to prevent the rotation of the sleeve with the casing.

In testimony whereof I have signed my name to this specification in the presence of the two subscribing witnesses.

EUGENE D. ROBERTS.

Witnesses:
 HENRY C. ORD,
 FREDERIC P. DRAVIS.

Copies of this patent may be obtained for five cents each, by addressing the "Commissioner of Patents, Washington, D. C."